Nov. 23, 1937.　　　　　C. G. HALL　　　　　2,100,031
DEVICE FOR MAKING FROZEN CONFECTIONS
Filed Nov. 30, 1934　　　3 Sheets-Sheet 1

Inventor
Charles G. Hall

Nov. 23, 1937.   C. G. HALL   2,100,031
DEVICE FOR MAKING FROZEN CONFECTIONS
Filed Nov. 30, 1934    3 Sheets-Sheet 2

Inventor
Charles G. Hall
By Thomas Bily
Attorney

Nov. 23, 1937.  C. G. HALL  2,100,031
DEVICE FOR MAKING FROZEN CONFECTIONS
Filed Nov. 30, 1934   3 Sheets-Sheet 3

Inventor
Charles G. Hall
By Thomas Bilyeu
Attorney

Patented Nov. 23, 1937

2,100,031

UNITED STATES PATENT OFFICE 2,100,031

DEVICE FOR MAKING FROZEN CONFECTIONS

Charles G. Hall, Caldwell, Idaho, assignor to Edible Bottle Company, a corporation of Idaho Application November 30, 1934, Serial No. 755,451

7 Claims. (Cl. 107—8)

My invention relates to a device for the manufacture of frozen edible confection containers.

The confection made by my machine and device is a frozen confection. The confection is edible, has a central opening disposed longitudinally thereof that may be filled with any edible enrichment such as sundae material, ice cream or other material that is edible and that will enrich and enhance the edibility and palatability of the material from which the edible container is made.

The device is comprised primarily of an insulated cabinet having a plurality of compartments disposed therein. Each of the compartments is refrigerated to maintain low temperatures within the cabinet. Portable top and bottom molds are provided. The bottom or cavity mold has a plurality of like sections depending therefrom and the top mold has a similar number of core sections. Each core section is smaller in cross sectional area than its complementary cavity section and when the core mold is placed within the cavity mold a space is provided between the complementary cores and the cavities that may be filled with the fluid of which the open ended edible container is to be made. A refrigerant is circulated continuously through the top or core section to provide facilities for congealing the material that is to form the edible container. A track is provided at either side and longitudinally of the cabinet over which a tank may be run to permit the depositing of the edible container fluid in the bottom or cavity mold.

Stanchions are disposed at each end of the cabinet and a track connects the respective stanchion posts. The track is disposed above, longitudinally of and centrally of the cabinet. A trolley is disposed upon the track and a yoke is suspended from the trolley assembly. The yoke is shaped and fashioned to engage the rim of each of the mold sections and a rope or cord connects the yoke with the trolley and the rope is trained about a plurality of sheave blocks to provide suitable means for elevating and lowering the respective molds. A tank is disposed at one end of the cabinet and the tank is made to hold a liquid that may be heated therein. The liquid is used as an outer coating for the frozen open ended containers while the same are disposed upon the cores of the top mold. A second receiving tank is provided at the end into which the completed product may be deposited.

My invention comprises a supply station for a fluid to be used and congealed into open ended frozen confections. A freezing station, a coating station and a receiving station are provided. The cavity molds are filled with the fluid, the core mold, inserted in the cavity molds, the fluid then frozen, dipped into the coating composition and finally deposited at a receiving station.

The primary purpose and object of my invention is to provide means for the commercial manufacture of an open ended confection container made of a frozen edible substance.

A still further object of my invention consists in providing for the continuous manufacture of a frozen edible open ended confection container that may be coated on its exterior with an enriched coating.

A still further object of my invention consists in so constructing the device that in the continuous operation in the production of edible containers it will have a long and useful life with practical freedom from operating annoyances.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings.

Like reference characters refer to like parts throughout the several views.

Figure 1:
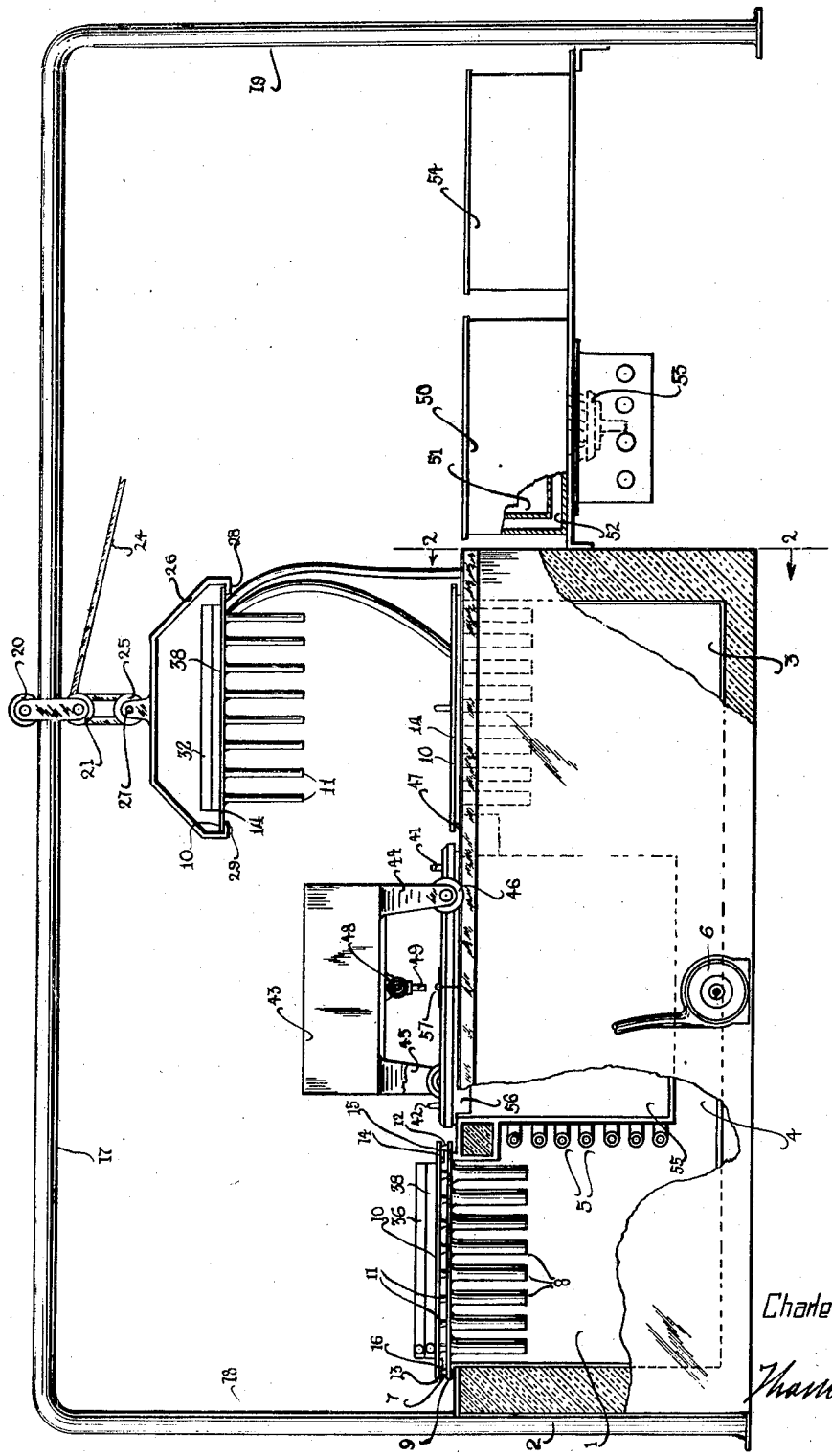
Fig. 1 is a side view partially in section of the complete machine for making my new and improved frozen edible container.
Figure 2:
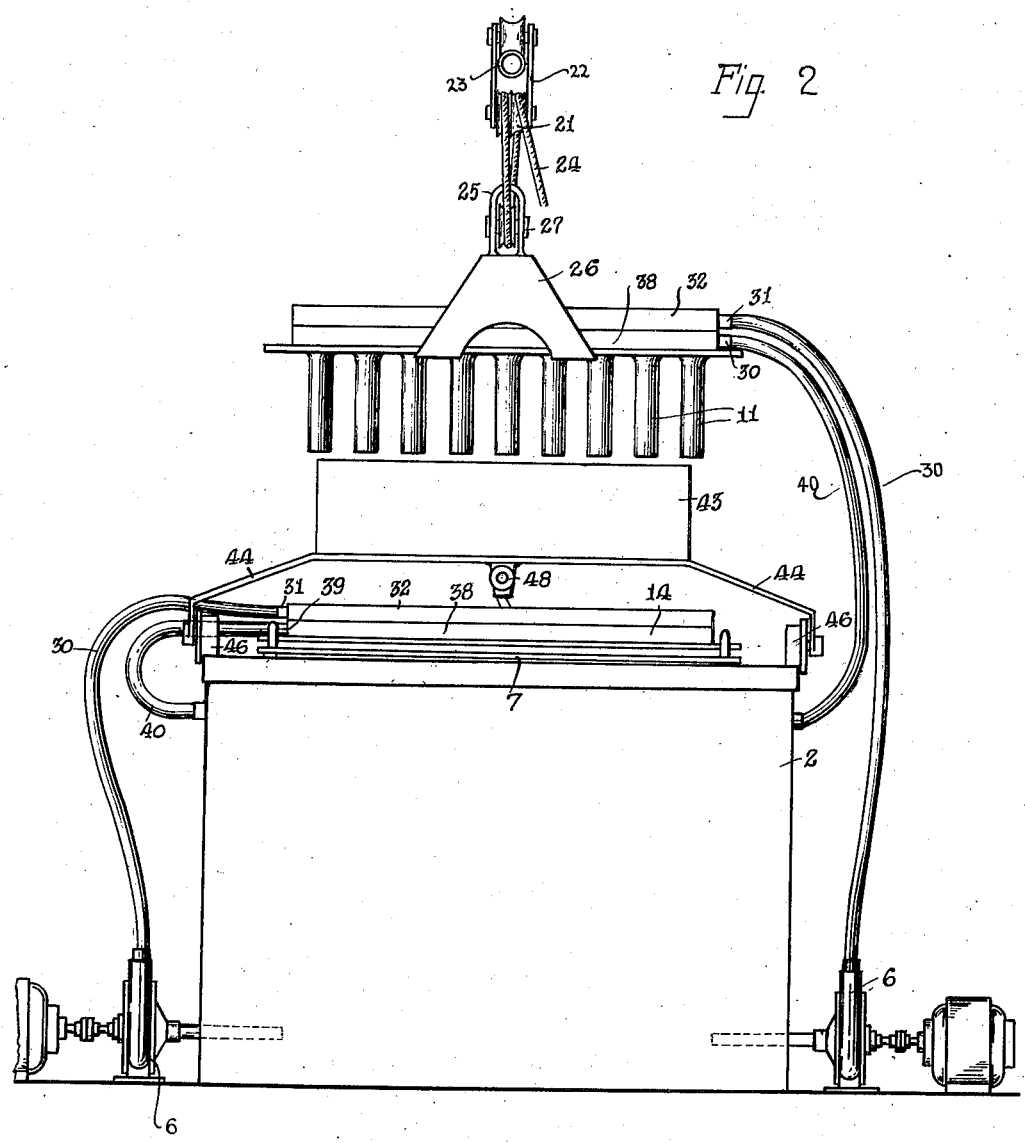
Fig. 2 is an end view of the device illustrated in Fig. 1. This view is taken on line 2—2 of Fig. 1, looking in the direction indicated.

My device is primarily comprised of a pair of refrigerated chambers 1 and 3 contained within an insulated cabinet 2. The chambers have a refrigerant circulated therearound through coils 5 disposed within the cabinet 2. The chambers 1 and 3 are separated by a refrigerated storage compartment 55 but communicate with each other through any suitable passageway 4 beneath the storage compartment. The refrigerant is circulated through the cooling system by any suitable pump 6. This pump takes the refrigerant from a source of supply not here shown and circulates the same through the respective refrigerating chambers.

Figure 3:
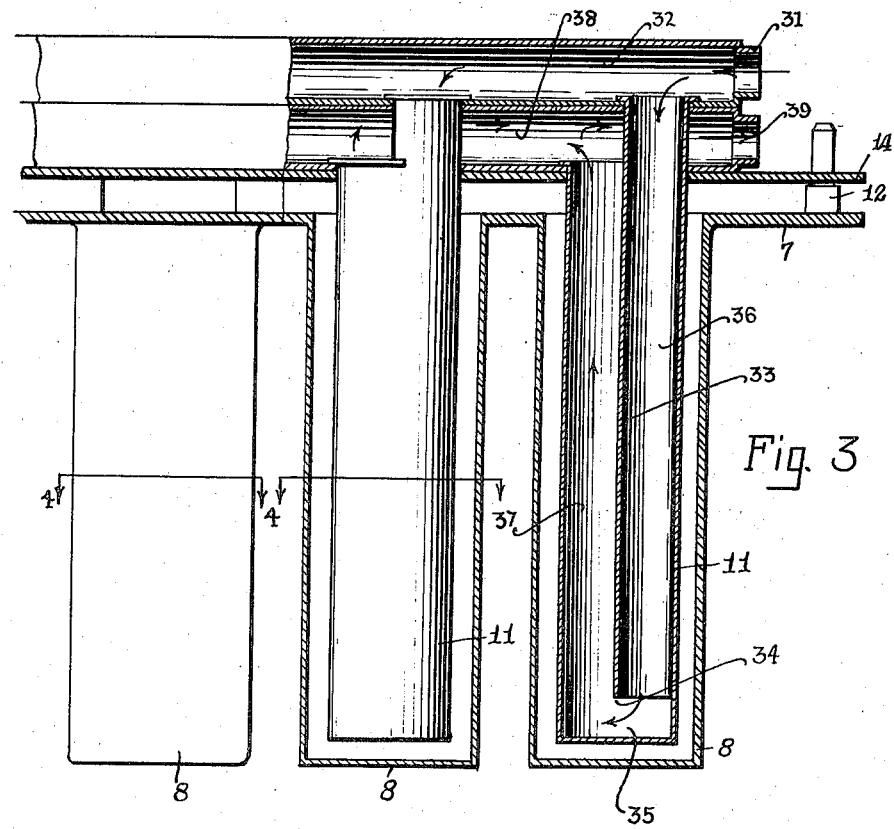
Fig. 3 is a fragmentary sectional side view of the complete mold in which the frozen edible confection is to be made. This view is made to show the circulation of the refrigerant within the top or core of the mold.
Figure 4:
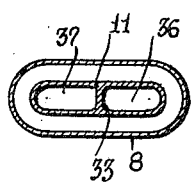
Fig. 4 is a sectional plan view of one of the containers in which the edible confection is to be formed. This view is taken on line 4—4 of Fig. 3, looking in the direction indicated.
Figure 5:
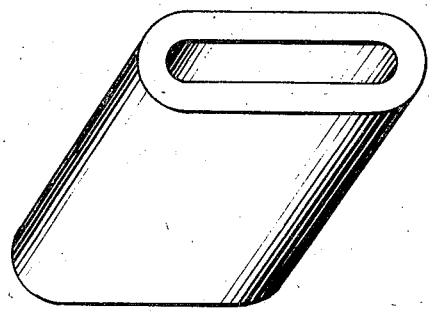
Fig. 5 is a perspective side top view of one of the confections to be made by my device.
Figure 6:
Fig. 6 is a sectional front view of one of the finished products to be made by my device.

A bottom or cavity mold 7 comprising a plurality of cavities 8 is suspended within the chamber 1. The mold 7 has a flange extending outwardly about the rim. This rim comes to rest directly upon the top rim 9 of the chamber 1. An inner, or core mold 10 is provided and a plurality of core sections 11 extend downwardly therefrom. The core sections 11 and the cavity sections 8 are complementary, there being the same number of cores in the mold 10 as there are cavities in the mold 7. The cores are adapted to be inserted within their complementary cavities so that they are spaced apart from the inner surface of the cavities as illustrated in Fig. 3. Lugs 12 and 13 extend upwardly from the top side of the mold 7, and the rim 14 of the mold form 10 rests directly upon these lugs. The lugs are so constructed as to space the bottom end of the core sections 11 from the inner bottom surface of the cavity sections 8.

Positioning holes (not shown) are disposed within the rim 14 of the mold 10 and the same are made to engage the lugs 12 and 13 as best shown in Fig. 3, to precisely position the molds relative to each other.

A track 17 runs longitudinally of the treating assembly and the track 17 is supported upon stanchions 18 and 19. A trolley 20 is disposed upon the track 17 and a sheave block 21 is journaled in spaced relation with the trolley by supporting links 22 and 23. A supporting line 24 is trained about the sheave blocks 21 and 25 and a suspending yoke 26 depends from the shaft 27 about which the sheave block 25 is journaled and the terminal ends 28 and 29 of the yoke are positioned to precisely engage beneath the rim of the core mold and facilitates the same being lifted from the cavity molds. A space is also provided beneath the rim 14 of the cavity mold so that the cavity mold as well as the core mold may be handled by the yoke 26.

A divided chest is superposed above the outer or core mold in order that refrigerant may be circulated through the cores of the mold.

Referring to Fig. 3 the circulating cooling medium is conducted to the mold from the pump through a flexible conductor 30 and the flexible conductor 30 is connected to the collar 31 of the top section 32 of the divided chest. The refrigerant circulates therefrom downwardly through each core of the inner mold. The inner mold core sections are transversely divided for the major portion of their length by a partition 33. The end 34 of the partition 33 is spaced apart from the bottom inner end of the core to provide a passageway 35 through which the refrigerant circulates. The refrigerant flows from the flexible conductor 30 directly into the top 32 of the chest, then through the core by passing downwardly through the section 36 of the core, then upwardly through the section 37 of the core and back into the bottom portion 38 of the chest and returns to the source of supply through a collar 39 to which the flexible conductor 40 is secured. Pairs of dowel pins 41 and 42 are positioned at the oppositely disposed ends of the assembly and these dowel pins are adapted to be fitted into the rim of each of the molds and to precisely position the same within receiving holes disposed within the rims of the respective molds.

The material for filling the cavity mold is disposed within a filling tank 43. The filling tank 43 has pairs of legs 44 and 45 that downwardly extend from each corner of the tank and a wheel 46 is journaled within the bottom end of each of the legs. A track 47 runs longitudinally at either side of the cabinet to facilitate the movement of the tank therealong. A valve 48 is disposed at the bottom of the tank. When the valve is open the materials flow through a filler stem 49 into the cavity mold and fills the cavities with the product of which the edible confection container is to be made.

I have found there is a sale for these edible containers where the same are coated with an outer enriched coating such as chocolate or other high quality product. Where this is desired, the core mold, to which the edible container adheres, may then be partially immersed within a tank 50 that contains a coating substance. This container has a central portion 51 that contains the coating material. The central portion 51 is jacketed by a water jacket 52 and the desired temperature is maintained therein by any suitable heating head 53 that is disposed immediately below the tank.

After the edible containers are immersed within the tank 50 the same may then be deposited within a receiving station 54. A central storage reservoir 55 may be placed central of the primary cabinet and a removable insulated top 56 is provided for this storage space. The top is composed of two sections hinged together as illustrated at 57. This provides a station into which the frozen edible confections and other materials to be merchandised are maintained at suitable temperatures until used or sold. The refrigerant medium is circulated independently through each of the core molds by having independent pumping units for that purpose, each of which is supplied with flexible conductors.

While the form of mechanism herein shown and described is admirably adapted to fulfill the objects primarily stated, it is to be understood that it is not intended to confine the invention to the embodiment herein shown and described, as it is susceptible of embodiment in various forms, and in various methods all coming within the scope of the claims which follow.

What I claim is:

1. In a device of the class described, the combination of an insulated cabinet having a plurality of compartments, means for predetermining the temperature in each of the compartments, bottom and top mold sections, means for transporting each of the mold sections, one at a time, in either direction longitudinally of the cabinet and means for continuously circulating a refrigerant through each of the core sections comprising the top mold.

2. In a device of the class described, in combination, a cabinet, a plurality of compartments disposed within the cabinet, means for developing low temperatures within the cabinet compartments, a track disposed longitudinally of and at either side of the cabinet, a track disposed above the cabinet and extending longitudinally and centrally thereof, a tank superposed upon the cabinet and adapted to be moved upon the tracks disposed on either side of the cabinet, top and bottom mold sections, means for maintaining the top mold section in uniform spaced relation with the bottom mold section, means for elevating, transporting and lowering the respective mold sections and means for circulating a refrigerant continuously through the cores of the top mold section.

3. In a device of the class described, in combination, a refrigerated compartmented cabinet, a portable tank, a filler spout depending from the filler tank, a valve disposed within the filling spout, portable core and cavity mold sections disposed at either end of the cabinet manually manipulative, means for elevating, transporting and lowering each of the mold sections independently and means for supplying a refrigerant to the core mold section.

4. In a device of the class described, the combination of a cabinet, means for maintaining low temperatures within the cabinet, complementary molds comprising a cavity mold and a core mold, means for maintaining spaced relation between the complementary molds, means for elevating, transporting or lowering each of the molds, means for filling the cavity mold and means for refrigerating the cores of the core mold.

5. In a device of the class described, a refrigerated cabinet, a pair of molds, the bottom one of the molds being the female section and the top one of the molds being the male section, means for predetermining the working spaced relation between the mold sections and instrumentalities for circulating a cooling medium continuously through the male mold sections.

6. In a device of the class described, the combination of male and female mold sections, supporting and transporting means for each of the mold sections, means for filling the female mold sections and means for continuously circulating a cooling medium through the male mold sections, and instrumentalities for maintaining spaced relation between the respective molds.

7. In a device of the class described, the combination of a top and bottom mold, means for filling the bottom mold, means for supporting the core of the top mold in spaced relation with the bottom mold, and means for circulating a refrigerant continuously through the cores of the top mold.

CHARLES G. HALL.